Patented Jan. 2, 1945

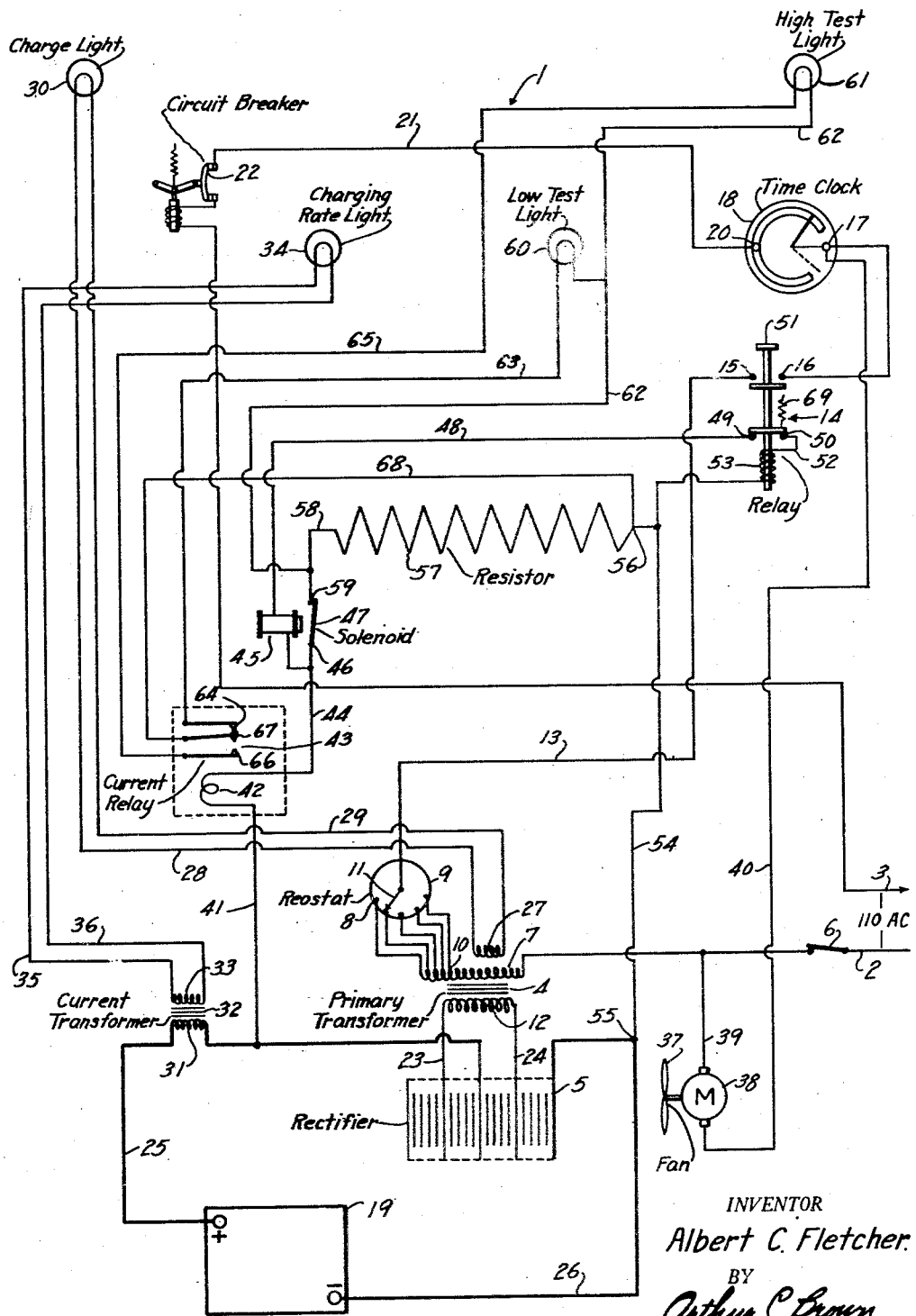

2,366,505

UNITED STATES PATENT OFFICE 2,366,505

CHARGING APPARATUS FOR STORAGE BATTERIES

Albert C. Fletcher, Oklahoma City, Okla., assignor to Quick Charge, Incorporated, Oklahoma City, Okla., a corporation of Oklahoma Application April 7, 1943, Serial No. 482,171

6 Claims. (Cl. 320—14)

This invention relates to charging apparatus for storage batteries, and more particularly to an apparatus for quick charging and desulphating storage batteries, and has for its principal object to provide controls and indicators in such apparatus for controlling the charging and discharging of a battery and indicating the condition of the battery and operation of the apparatus.

Other objects of the invention are to provide visual indicators for automatically indicating operation of the apparatus and if a minimum of current is passing therethrough; to provide visual indicators for indicating whether the charge of the battery is above or below a satisfactory charged condition; to provide signal lights and controls therefor for indicating amperage and voltage in the apparatus; to provide an automatic apparatus for discharging, charging, and protecting the battery against damage; and to provide improved elements and arrangements thereof in battery charging apparatus of the character and for the purposes set forth.

In accomplishing these and other objects of the invention, as hereinafter described, I have provided improved details of structure, the preferred form of which is illustrated diagrammatically in the accompanying drawing, wherein:

The single figure shows a schematic arrangement of a storage battery charging apparatus including indicators and circuits therefor.

Referring more in detail to the drawing:

1 designates a battery charging apparatus using alternating current as an energy source and of the current rectifying type including conductors 2 and 3 connected with an alternating current source (not shown) preferably of 110 or 220 volts such as the usual power lines for supplying current to a transformer 4 and a rectifier 5. The conductor 2 is provided with a master switch 6 for controlling supply of current. The conductor 2 is shown as directly connected with the primary winding 7 of the transformer 4 and the primary winding is connected to a plurality of points 8 of a multi-point switch 9 by leads from taps 10 on the primary winding whereby the contact arm 11 may be moved to selected points of the multi-point switch to adjust the current passing through the primary winding 7 to a proper value to produce the desired current voltage in the secondary winding 12 of the transformer 4.

The contact arm 11 of the multi-point switch is connected by a conductor 13 having a relay switch 14 therein having contacts 15 and 16 which are normally closed to permit current to flow through said conductor to one terminal 17 of a time clock 18 which operates as a control switch for controlling the current supply and automatically controlling the time a storage battery 19 is undergoing a charge. The other terminal 20 of the time clock is connected by a conductor 21 with a circuit breaker 22 which is connected with the current source conductor 3, the circuit breaker preferably being of the type which automatically cuts the power off in case of over load on short circuit thereby protecting the charging apparatus and the battery being charged.

The terminals of the secondary winding 12 of the transformer 4 are connected by conductors 23 and 24 with the rectifier 5 preferably of the dry metallic plate type wherein the output current is converted to a direct current which is delivered to the storage battery 19 under charge through conductors 25 and 26, the conductor 25 being connected with the positive terminal of the battery and the conductor 26 to the negative terminal of the battery as shown in the drawing.

Flow of current through the primary winding 7 of the transformer 4 produces a potential in a secondary winding 27 also included in the transformer 4, the secondary winding 27 being connected by conductors 28 and 29 with a signal preferably a light 30 which is illuminated to indicate that the apparatus is ready for or is operating.

A primary winding 31 of a current transformer 32 is inserted in the conductor 25 so when the switches are closed and the apparatus is operating if as much as 70 amperes of current flows through the conductor 25 the pulsation of the direct current will produce a potential in the secondary winding 33 of the current transformer which is sufficient to operate a signal preferably a light 34 which is connected to the secondary winding 33 by conductors 35 and 36. The current transformer and charging rate light 34 are such that when said light is illuminated it indicates a minimum of current flow of 70 amperes. As indicated by the current flow my apparatus contemplates a quick charge of the storage battery. Therefore the transformer and rectifier are cooled by a fan 37 operated by a motor 38 having connection with the current supply conductor 2 by a conductor 39 and with the terminal 17 of the time clock 18 by a conductor 40 so the fan motor circuit is completed and the fan operated only when the current is passing through the apparatus as controlled by the time clock.

Also included in the present apparatus is a circuit for controlling rapid discharge of the battery for correcting a sulphated condition of the battery. It being well known that sulphation continues throughout the life of a battery and if a battery is in what is termed a sulphated condition, the sulphate has insulated the plates and built up the internal resistance of the battery to such a degree that it cannot be charged up to the maximum capacity for which the battery was designed. The sulphated condition of a battery is corrected by alternately rapidly charging and discharging the battery.

In order to effect the rapid discharge of the battery undergoing charge a conductor 41 connects the conductor 25 with a coil 42 of a current relay 43 which coil is also connected by a conductor 44 to the winding 45 and one pole 46 of a solenoid switch 47. The solenoid winding 45 is connected by a conductor 48 with the contacts 49 and 50 in the relay 14 operated by a push button 51 which when operated opens the conductor 13 and closes the circuit through the conductor 48, the contact 50 of the relay being connected through a conductor 52 to a holding coil 53 which holds the relay contact 49 and 50 closed, while current is passing therethrough. The holding coil is connected by a conductor 54 with the conductor 26 as at 55.

One terminal 56 of a resistor 57 is connected to the conductor 54 and the other terminal is connected by a conductor 58 with a contact 59 of the solenoid switch 47. Connected in parallel with the resistor 57 are signals 60 and 61 preferably lights under control of the current relay, both of the lights being connected to the conductor 58 by a conductor 62, the light 60 being connected by a conductor 63 with a contact 64 and the light 61 being connected by a conductor 65 with a contact 66 of the relay. The contacts 64 and 66 of the relay are adapted to be engaged by a movable contact 67 controlled by the current passing through the coil 42 so the movable contact 67 normally engages the contact 64 until sufficient current passes through the coil 42 to actuate the movable contact 67 to engage contact 66, circuit through the movable contact being completed through a conductor 68 which connects with the terminal 56 of the resistor.

In operating a charging apparatus such as described and assuming that a battery 19 is to be charged, the conductors 2 and 3 are connected with a source of alternating current supply and the battery is connected with the conductors 25 and 26. The push button is pressed to engage the contacts 49 and 50, thus energizing coil 45 to cause the engagement of contacts 46 and 47 and the battery current will flow from the battery through the conductors 25 and 41, coil 42, winding 45, conductor 48, contacts 49 and 50, conductor 52, holding coil 53, and conductors 54 and 26 to the negative pole of the battery. Current flowing through the winding 45 effects closure of the switch 47 so current also flows through the conductor 58 and resistor 57 to the conductor 54 to regulate the rate of discharge of the battery. The push button may be released by momentarily disconnecting one of the conductors from the battery.

If the battery is in discharged condition the movable contact 67 remains engaged with the contact 64 and current flows through the conductor 62, light 60, conductor 63, contacts 64 and 67, conductor 68 to the conductor 54 to cause the light to be illuminated to indicate that the battery is discharged. If sufficient current passes through the coil 42 to actuate the movable contact 67 current flows through the conductor 62, light 61, conductor 65, contacts 66 and 67, conductor 68 to the conductor 54 to illuminate the light 61 to indicate the battery is in charged condition.

If the light 56 is illuminated in the load test it is desirable to charge the battery and the clock 18 is preferably set for approximately forty five (45) minutes and the switch 6 closed. The push button may then be pressed to further discharge the battery and when the current passing through the holding coil 53 is insufficient to overcome the spring 69 the push button will be released closing the contacts 15 and 16 in the conductor 13 and the apparatus will automatically start charging, current flowing through the conductor 2, primary winding 6 of the transformer 4, taps 10, multi-point switch arm 11, conductor 13, contacts 15 and 16, time clock 18, conductor 21, circuit breaker 22 and conductor 3, producing a potential in the secondary winding 12 of the transformer 4 to effect a current through the conductor 23, rectifier 5 and conductor 24 to form a direct current which flows from the rectifier 5 through the conductor 25, battery 19 and conductor 26 to charge the battery.

The current flowing through the primary winding 7 also produces a potential in the secondary winding 27 to effect illumination of a light 30 to indicate the apparatus is operating. Current flowing through the conductor 25 passes through the primary windings 31 of the current transformer 32 to produce a potential in the secondary winding 33 to effect a flow of current through the conductor 35, charge rate light 34 and conductor 36 to effect illumination of the light providing the current in the primary winding 31 is above 70 amperes. If the light is not illuminated the arm 11 of the multi-point switch is moved to its maximum position to increase the current in the primary winding 7 until the light 34 is illuminated to indicate sufficient current is flowing to the battery. If the light still is not illuminated the battery is in sulphated condition and should be charged for about 10 minutes. When this is done the push button is pressed and when the battery is discharged the relay 14 will automatically operate to again start charging of the battery. If the light is illuminated a suitable charging rate is flowing into the battery. However, if the charging rate light 34 is illuminated after discharging and then ceases to glow after a few minutes, the sulphation has not been corrected in the battery and the charging and discharging operation should be repeated.

In order to cool the transformers and rectifier the fan 37 is operated by current passing through the motor circuit consisting of conductor 39, motor 38 and conductor 40 to the clock terminal 17 which is in parallel circuit with the primary winding 7 of the transformer 4.

From the foregoing it is obvious that I have provided a charging apparatus for producing a quick charge of a battery and desulphating the plates thereof, which apparatus has visual indicators to indicate the operation of the apparatus and condition of the battery.

What I claim and desire to secure by Letters Patent is:

1. In an apparatus for charging a storage battery, a transformer having primary and secondary windings, a circuit supplying alternating current to the primary winding, a rectifier connected with the secondary winding of the transformer, a circuit connecting the output of the rectifier with a battery to be charged, a resistor, a circuit connecting said resistor across said charging circuit for effecting discharge of the battery under control of said resistor, a switch for selectively controlling the charging and resistor circuits respectively whereby the battery may be discharged under control of the resistor, a transformer having a primary winding in the charging circuit, a secondary winding in the second-named transformer, a circuit connected with the secondary winding of the second-named transformer and including a signal light responsive to pulsations of the direct current in the charging circuit for indicating the current rate passing through the charging circuit, and means including signals for indicating the current flow in the respective circuits.

2. In an apparatus for charging a storage battery, a transformer having primary and secondary windings, a circuit supplying alternating current to the primary winding, a rectifier connected with the secondary winding of the transformer, a circuit connecting the output of the rectifier with a battery to be charged, a transformer having a primary winding in the charging circuit, a secondary winding in the second named transformer, and a circuit connected with the secondary winding of the second named transformer and including a signal light responsive to pulsations of the direct current in the charging circuit for indicating the current rate passing through the charging circuit.

3. In an apparatus for charging a storage battery, a transformer having primary and secondary windings, a circuit supplying alternating current to the primary winding, a rectifier connected with the secondary winding of the transformer, a circuit connecting the output of the rectifier with a battery to be charged, a resistor, a circuit connecting said resistor across said charging circuit for effecting discharge of the battery under control of said resistor, a switch for selectively controlling the charging and resistor circuits respectively whereby the battery may be discharged under control of the resistor, a transformer having a primary winding in the charging circuit, a secondary winding in the second-named transformer, a circuit connected with the secondary winding of the second-named transformer and including a signal light responsive to pulsations of the direct current in the charging circuit for indicating the current rate passing through the charging circuit, signal lights connected in parallel circuits with the resistor, and means responsive to the current flow in the resistor circuits for controlling the respective signal light circuits.

4. In an apparatus for charging a storage battery, a transformer having primary and secondary windings, a circuit supplying alternating current to the primary winding, a rectifier connected with the secondary winding of the transformer, a circuit connecting the output of the rectifier with a battery to be charged, a resistor, a circuit connecting said resistor across said charging circuit for effecting discharge of the battery under control of said resistor, a switch for selectively controlling the charging and resistor circuits respectively whereby the battery may be discharged under control of the resistor, a transformer having a primary winding in the charging circuit, a secondary winding in the second-named transformer, a circuit connected with the secondary winding of the second-named transformer and including a signal light responsive to pulsations of the direct current in the charging circuit for indicating the current rate passing through the charging circuit, a signal light connected in parallel circuit with the resistor, and a relay switch responsive to the battery current flow in the resistor circuit for closing the light current for indicating the battery is in charged condition.

5. In an apparatus for charging a storage battery, a transformer having primary and secondary windings, a circuit supplying alternating current to the primary winding, a rectifier connected with the secondary winding of the transformer, a switch in the primary circuit for controlling supply of current to the transformer, a circuit connecting the output of the rectifier with a battery to be charged, a transformer having a primary winding in the charging circuit, a secondary winding in the second named transformer, and a circuit connected with the secondary winding of the second named transformer and including a signal light responsive to pulsations of the direct current in the charging circuit for indicating the current rate passing through the charging circuit.

6. In an apparatus for charging a storage battery, a transformer having primary and secondary windings, a circuit supplying alternating current to the primary winding, a rectifier connected with the secondary winding of the transformer, a switch in the primary circuit for controlling the supply of current to the transformer, a circuit connecting the output of the rectifier with a battery to be charged, a resistor, a circuit connecting said resistor across said charging circuit for effecting discharge of the battery under control of said resistor, a switch for selectively controlling the charging and resistor circuits, a solenoid connected in the resistor circuit, a current relay in said last named circuit whereby the battery may be discharged under control of the resistor, a transformer having a primary winding in the charging circuit, a secondary winding in the second named transformer, and a circuit connected with the secondary winding of the second named transformer and including a signal light responsive to pulsations of the direct current in the charging circuit for indicating the current rate passing through the charging circuit.

ALBERT C. FLETCHER.